United States Patent [19]
Rubin et al.

[11] Patent Number: 5,882,527
[45] Date of Patent: Mar. 16, 1999

[54] METHOD OF ACCELERATING THE DISSOLUTION RATE OF ACCUMULATED FILTER CAKE BY CHANNELING GAS BUBBLES THROUGH THE CAKE

[75] Inventors: Bruce J. Rubin, Rochester; Carl B. Richenberg, Batavia; David M. Melos, Rochester, all of N.Y.

[73] Assignee: Eastman Kodak Company, Rochester, N.Y.

[21] Appl. No.: 780,509

[22] Filed: Jan. 8, 1997

[51] Int. Cl.⁶ .................................................. B01D 37/00
[52] U.S. Cl. .................. 210/769; 210/773; 210/772; 210/791; 210/797; 210/192; 423/658.5
[58] Field of Search ..................... 210/673, 791, 210/792, 793, 794, 797, 798, 769, 772, 773, 192; 423/658.5

[56] References Cited

U.S. PATENT DOCUMENTS

| | | |
|---|---|---|
| 1,101,639 | 6/1914 | Leach . |
| 2,937,069 | 5/1960 | Zoellner ........................................ 8/137 |
| 4,065,388 | 12/1977 | Flynn et al. . |
| 4,075,281 | 2/1978 | Port et al. ................................ 210/673 |
| 4,113,613 | 9/1978 | Sekoulov et al. . |
| 4,172,185 | 10/1979 | Petheram ................................... 521/26 |
| 4,448,693 | 5/1984 | Kiehling et al. ......................... 210/673 |
| 4,786,418 | 11/1988 | Garg et al. ............................... 210/673 |
| 4,857,211 | 8/1989 | Nineuil et al. ........................... 210/797 |
| 4,894,167 | 1/1990 | Holl et al. ................................ 210/673 |
| 5,217,629 | 6/1993 | Makiniemi et al. ..................... 210/797 |

*Primary Examiner*—Robert J. Popovics
*Attorney, Agent, or Firm*—Arthur H. Rosenstein

[57] ABSTRACT

A process of dissolving solid waste material in packed beds comprises the addition to the packed bed of a solvent for the solid waste and a material which releases a gas on contact with the solvent which forms channels in the packed bed allowing more rapid access of the solvent to the bed.

7 Claims, 2 Drawing Sheets

METHOD OF ACCELERATING THE DISSOLUTION RATE OF ACCUMULATED FILTER CAKE BY CHANNELING GAS BUBBLES THROUGH THE CAKE

FIELD OF THE INVENTION

This invention relates generally to the dissolution of a particulate bed containing solid waste, specifically, to the use of in-situ gas production and or release to create pathways to allow the solvent for the particles in the bed to rapidly diffuse through the bed rather than having the bed cake up when the solvent is added, causing a slower dissolution rate.

BACKGROUND OF THE INVENTION

In certain operations the product is in solution and an unwanted solid is dispersed in that solution. The unwanted material can be removed by filtration. This often result in a deep bed of solids. In most cases the solid is mechanically removed and the filter washed and cleaned. Mechanical removal is a problem because it requires manual shoveling of the material and the need to dispose of solid waste. This problem can be solved by using a solvent for the solid and dissolving it away. During the dissolution process the deep bed of solids has a tendency to collapse as it dissolves plugging the pores in the bed and impeding the dissolution time.

U.S. Pat. No. 1,101,639 teaches that a filter with the bulk of the solids removed can be cleaned by a liquid solvent for the material left caked on the filter.

Several patents (U.S. Pat. No. 4,786,418; U.S. Pat, No. 4,894,167; U.S. Pat, No. 4,172,185; and U.S. Pat, No. 4,448,693 describe using a gas mixed with a liquid to form a weak acid for regenerating ion exchange beds. In this case the bed is not dissolved but the ionic species are renewed.

U.S. Pat. No. 4,065,388 uses air pressure from externally introduced air to force water through the pores of an ion exchange bed to clean it out. The bed remains intact throughout the process and dissolution does not occur.

U.S. Pat. Nos. 4,857,211 and 2,937,069 describe the cleaning of the surface of a filter by dissolving the deposits thereon with a solvent formed from a gaseous reaction external to the bed. The majority of the material in the bed is removed by mechanical means before the treatment begins.

U.S. Pat. No. 5,217,629 involves a filter that has the bulk solids removed from catalyst particles. The insoluble catalyst particles remaining in the filter react with hydrogen peroxide to liberate oxygen bubbles that blow the filter pores clean of insoluble catalyst. The patent does not mention a deep bed of particles nor the internal opening of pores to solvent action to dissolve the deep bed efficiently.

A problem in the art is to increase the dissolution rate of a packed bed in such a way as to decrease the time required for dissolution.

SUMMARY OF THE INVENTION

A major object of the present invention is to improve the process of dissolving waste product in a packed bed such as a filter bed with a solvent to achieve a clean filter.

A further object of this invention is to reduce dissolution time of waste solids in packed beds such as filter beds.

Deep beds of material can be formed during filtration. This is sometimes the waste and not the product. One way to dispose of the filter cake waste is to dissolve it. In many cases when a solvent contacts the cake it collapses it blocking further dissolution for a period of time.

When a gas or gas releasing agent is contained within or codeposited with the waste, a gas is generated or released on contact with the solvent. The gas released will open cracks in the filter cake and allow the cake to dissolve more rapidly.

Thus, a process of dissolving packed beds of waste product comprises adding to said bed a solvent capable of dissolving the waste product and generating or releasing on contact a gas, said emitted gas forming channels allowing rapid access of the solvent to the bed.

For a better understanding of the present invention, together with other and further objects, advantages and capabilities thereof, reference is made to the following detailed description and appended claims in connection with the preceding drawings and description of some aspects of the invention.

DETAILED DESCRIPTION OF THE PREFERRED EMBODIMENTS

According to the present invention, it has now unexpectedly been found that the time required for dissolution of waste solids is significantly decreased if the solvent contacting the bed can help create or release a gas in the bed. The pores of the solid waste are kept open by the emission of the gas and the furthering of the solvent encroachment results in reduced time for cleaning the filter bed and preparing it for use.

In the process of the present invention, a filter bed is used to filter a solution of the desired products such as photographic couplers, hardeners, dyes and the like from waste materials. The waste materials are generally formed as by-products of the chemical reactions carried out to form the desired product. The product passes through the filter bed in solution (filtrate) leaving the waste. The filter bed is made up of the by-products of the reaction and remains as waste.

The filter is generally of a type comprising a simple cloth as the filtering surface such as polypropylene or cotton duck.

Figure 1:
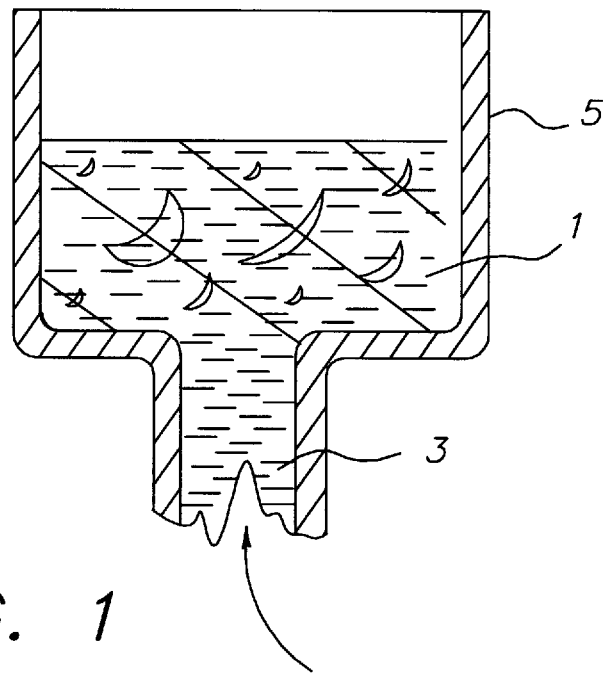
FIG. 1 depicts a filter bed filled with solid waste material.
Figure 2:
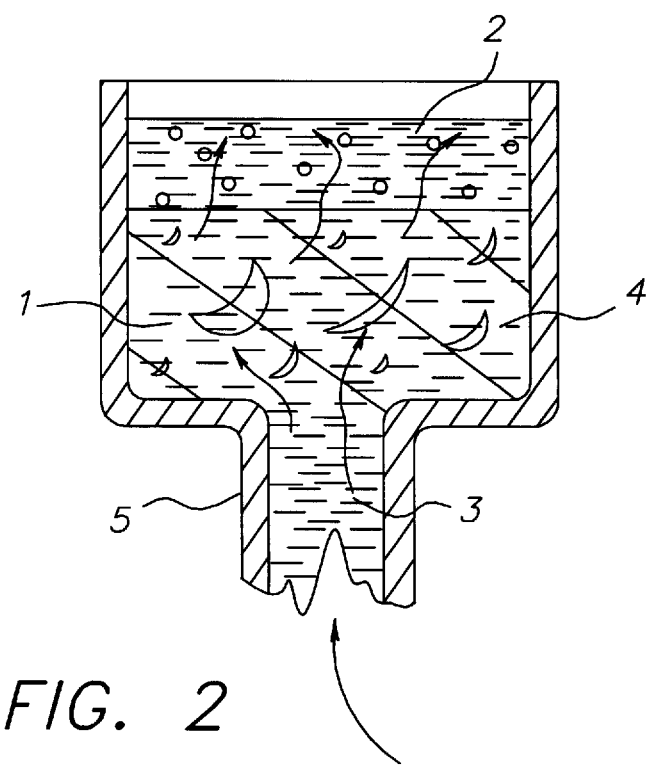
FIG. 2 depicts the filter bed of FIG. 1 which is being dissolved by solvent action alone.
Figure 3:
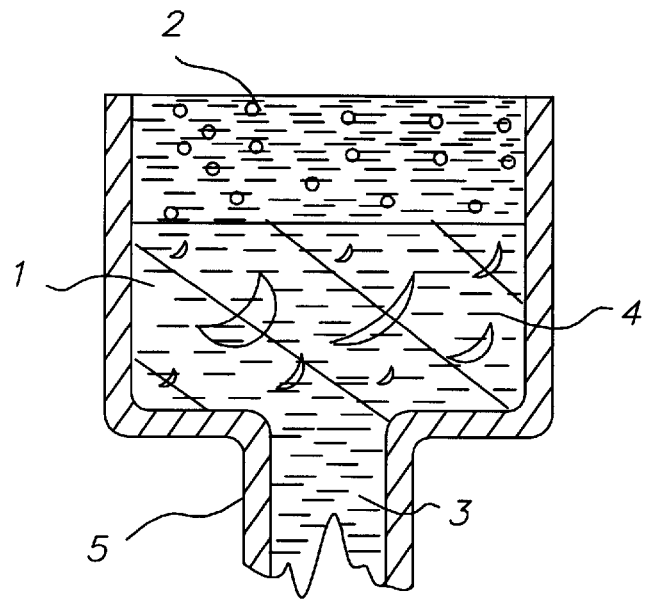
FIG. 3 show the filter bed of FIG. 1 which is being dissolved by solvent action with the solid waste containing a material which releases a gas upon contact with the solvent.
Figure 4:
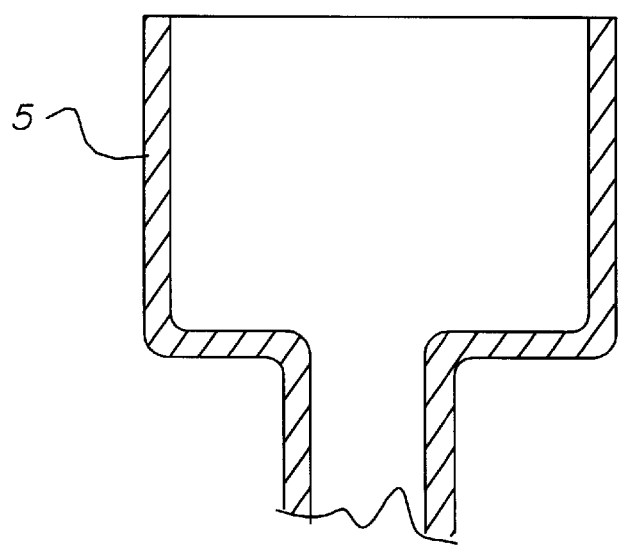
FIG. 4 shows the final bed condition with the solid waste completely dissolved.

For example, FIG. 1 shows a typical filter bed at the start of a cleaning operation. FIG. 2 shows the action of the solvent dissolution of the bed of waste (such as salt). FIG. 3 shows the use of dissolution as in FIG. 2 but with the generation or release of a gas with the solvent on contact, which opens the pores of the waste material to facilitate fast dissolution of the waste material. FIG. 4 depicts the final filter which is now free of solid waste material and ready for reuse.

In the preferred embodiment, the salt is deposited in a deep bed (1) such as a filter box during the removal of the product from a slurry fed to the box. The filter box is then subjected to a bottom feed of a hot water stream (3). The water can be heated from 20° C. to 100° C. This releases carbon dioxide gas. The carbon dioxide opens the cake up by bubbling out of it, creating a path for the water to rapidly penetrate the whole cake and increase the dissolution rate. The rate is much slower if no gas evolution is available (FIG. 2). At the end, the cake is completely dissolved from the filter box and the box is ready for the next batch of material.

The filter is designed to capture waste products and pass desirable products out in the filtrate. The products to be filtered can be couplers, dyes, hardeners, or the like.

When the above slurries are filtered, the packed beds preferably comprise waste solids such as inorganic salts, insoluble organics, and the like. The filtrate contains the product.

Solvents used to dissolve these waste products in the filter beds comprise water, solvent for the insoluble organics, and the like.

The amount of solvent used can be varied and is generally enough to saturate a dilute solution. The amount of gas or gas forming material is a function of the reaction or added in quantities to form cracks in the filter cake on activation.

If additional material is added to the filter bed with the solvent it is designed to react on contact with the solvent to form an emitted gas. Generally materials which react with various solvents, and the solvents reactable with these materials on contact to produce emitted gas are shown in Table 1 below.

TABLE 1

| Materials Added | Solvent | Gaseous Product |
| --- | --- | --- |
| Sodium Bicarbonate | Low pH water | $CO_2$ |
| Sodium Carbonate | Low pH water | $CO_2$ |
| Sodium Sulfite | Low pH water | $SO_2$ |

The gas could also exist in a saturated solution and be released by an increase in temperature. The gas that is emitted is sufficient to break up thick cakes of solid waste and allows the solvent to dissolve the solid waste in a decreased period of time.

The gas could also be released during the chemical reaction to form the solid by-product and be trapped or occluded in the by-product structure.

In order to further illustrate the present invention and the advantages thereof, the following examples are given, it being understood that it is intended only as illustrative and in no way limiting.

A chemical slurry containing dissolved product and unwanted salts plus sodium bicarbonate and some trapped carbon dioxide gas, for example, is filtered in a large filter box. The depth of the cake can be over 3 foot high. After the product solution is removed by vacuum, the remaining salts contain trapped gas plus a material capable of gas formation on contact with the solvent for the majority of the salts. In the simple example, water is added to a sodium chloride/sodium bicarbonate salt cake. The cake is formed into a deep bed from a non-solvent salt slurry. In an acid environment, the bicarbonate internal to the cake will decompose to carbon dioxide and water. The carbon dioxide in the cake will form channels to allow the water to rapidly penetrate into the cake and dissolve the large salt deposit. Without internal channeling the water penetrates much slower and the time to dissolve the cake becomes longer.

Comparative Example 1

In the first comparative example whose flow is depicted in FIG. 2, a 13" sodium chloride cake was prepared in a 3" diameter pressure filter by pouring in 1765 g of NaCl. Two washes of two liters each were added to the pressure filter (acetone+100 g of 36% HCl (pH<1). This was pressure filtered through the cake using 15 PSIg nitrogen. This mimics the removal of mother liquor in a chemical process and the washing of the cake to remove product. After most of the acetone/water was removed with the 15 PSI nitrogen, water was added backflushing through the cake. After 5¾ minutes all of the cake was dissolved.

EXAMPLE 1

The same procedure was used as above except 1% by weight of sodium bicarbonate was dry mixed into the NaCl before loading into the column. The cake was dissolved in 4¼ minutes with the aid of the internally generated gas bubbles from the bicarbonate breaking up the cake.

EXAMPLE 2

A sample containing process chemicals and salt in acetone was washed with acetone and backflushed with water. Despite the fact that a portion of the tacky product remained with the salt, the water was able to break up cakes of thickness' up to 2 feet rapidly due to internal generation of air bubbles.

EXAMPLE 3

An analine derivative is converted to a hydrazine hydrochloride. The process results in the formation of mixed sodium salts which include sodium sulfite. In an acid medium the sulfite breaks down to sulfur dioxide gas which remains trapped in the salt matrix as a gas or a crystal occlusion (gas trapped in the crystal structure during or post crystal formation). When the salt is dissolved in water the sulfur dioxide bubble help break up the salt cake and enhance cake dissolution.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

We claim:

1. A process of completely dissolving a packed bed of soluble waste, said packed bed of soluble waste consisting of a bed of solid waste resulting from a filtration process and a material which when contacted with a solvent forms gas bubbles, said material being either within said bed of solid waste or being co-deposited therewith, said process of completely dissolving a packed bed of soluble waste comprising the steps of:

a) passing a solvent through the packed bed of soluble waste, said solvent being capable of dissolving the packed bed of soluble waste and forming gas bubbles upon contact with said material;

b) allowing said solvent to dissolve said packed bed of soluble waste and to form gas bubbles upon contact with said material;

c) allowing said gas bubbles to create channels within said packed bed of soluble waste, thereby allowing rapid access to said packed bed of soluble waste by said solvent and increasing the dissolution rate of said packed bed of soluble waste; and d) continuing to pass solvent through said packed bed of soluble waste until said packed bed of soluble waste completely dissolves.

2. The process of claim 1 wherein the material is a bicarbonate and the solvent is water.

3. The process of claim 2 wherein the water is heated to a temperature from 20° to 100° C.

4. The process of claim 1 wherein the solid waste is a salt.

5. The process in claim 4 wherein the salt is sodium chloride.

6. The process of claim 1 wherein the packed bed of soluble waste is housed in a filter box.

7. The process of claim 1 wherein the solvent is introduced from a point under the packed bed of soluble waste.

* * * * *